United States Patent Office 3,813,396
Patented May 28, 1974

3,813,396
1,2-DIHYDROQUINOBENZOXAZEPINE[PIPER-
AZINYLALKYL]OXIMES
Harry L. Yale, New Brunswick, and Ramesh B. Petigara,
Somerset, N.J., assignors to E. R. Squibb & Sons, Inc.,
Princeton, N.J.
No Drawing. Filed Aug. 13, 1971, Ser. No. 171,715
Int. Cl. C07d 51/70
U.S. Cl. 260—268 PC   8 Claims

ABSTRACT OF THE DISCLOSURE 1,2-dihydroquinobenzoxa(or thia)zepine derivatives are provided having the structures

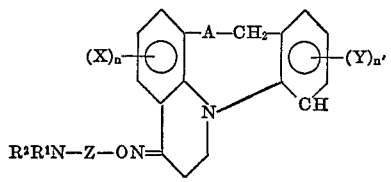

or

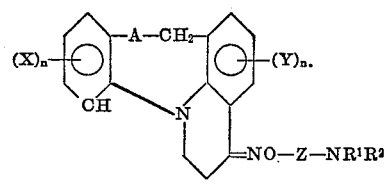

wherein A is O or S; X and Y are the same or different and can be halogen, trifluoromethyl, lower alkyl, cycloalkyl, lower alkylmercapto, lower alkoxy, cyano, isocyanido or di-lower alkylsulfamoyl; $R^1$ and $R^2$ are the same or different and can be halogen, lower alkyl, aralkyl or alkenyl or $NR^1R^2$ taken together is a heterocyclic radical having the formula

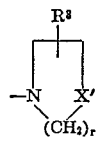

in which $X'$ represents $NR^4$, O, S, or $CH_2$; $r$ represents 1, 2 or 3; $R^4$ represents halogen, lower alkyl, hydroxy-lower alkyl, lower alkanoyloxy-lower alkyl, hydroxy-lower alkoxy-lower alkyl, di(lower alkyl) amino-lower alkoxy-lower alkyl, lower-alkylamino-lower alkyl, di-lower alkyl amino-lower alkyl, amino-lower alkyl, $R^3$ represents any of the $R^4$ groups; Z is alkylene or alkenylene; $n$ is 0, 1 or 2; and $n'$ is 0, 1 or 2; and pharmaceutically acceptable salts thereof.

The present invention relates to aminoalkyl ethers of 1,2-dihydroquinobenzoxa (or thia) zepine derivatives of the structure

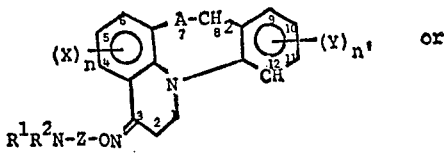 or

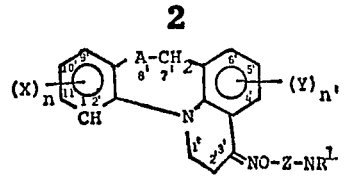

wherein X and Y are the same or different and can be halogen, trifluoromethyl, lower alkyl, cycloalkyl, lower alkylmercapto, lower alkyloxy, cyano, isocyanido or di-lower alkylsulfamoyl, A is O or S, Z is alkylene or alkenylene, $n$ is 0, 1 or 2 and $n'$ is 0, 1 or 2, and pharmaceutically acceptable acid-addition salts thereof.

The term "lower alkyl" as employed herein includes both straight and branched chain radicals of up to and including eight carbon atoms, for instance, methyl, ethyl, propyl, isopropyl, butyl, s-butyl, isobutyl, pentyl, hexyl, isohexyl, heptyl, 4,4-dimethylpentyl, octyl, 2,2,4-trimethylpentyl and the like.

The term "halogen" includes F, Cl, or Br or I.

The lower alkylmercapto groups contain up to eight carbon atoms and include methylmercapto, ethylmercapto, propylmercapto and mercapto radicals containing any of the lower alkyl groups mentioned hereinbefore.

The terms "lower alkyloxy" and "lower alkoxy" are interchangeable and refer to groups containing up to eight carbon atoms and which include any of the lower alkyl groups mentioned hereinbefore attached to an oxygen atom.

The term "cycloalkyl" includes saturated ring systems containing from three to seven carbons such as cyclopropyl, cyclobutyl, cyclopentyl, cyclohexyl and cycloheptyl.

The term "alkenyl" includes mono-unsaturated straight chain or branched chain radicals of less than eight carbons corresponding to "lower alkyl" as defined above.

The alkylene or alkenylene group represents a divalent straight or branched chain aliphatic hydrocarbon and can contain from one to six carbon atoms in a chain with or without side chains. The side chains can include cycloalkyl substituents. Examples of these groups include groups corresponding to the above alkyl or alkenyl groups.

In the above Formulae I and II, each of the carbocyclic aromatic rings can include 0, 1 or 2 substituents, other than hydrogen. The nature and position of the substituents in the starting materials will determine which isomer, Type I and/or Type II, is obtained.

$R^1$ and $R^2$ may be the same or different and represent hydrogen, lower alkyl, aralkyl and alkenyl; $NR^1R^2$ taken together is a heterocyclic radical having the formula

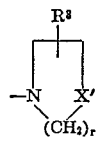

in which $X'$ represents $NR^4$, O, S or $CH_2$, $r$ represents 1, 2 or 3; $R^4$ represents hydrogen, lower alkyl, hydroxy-lower alkyl, lower alkanoyloxy-lower alkyl, hydroxy-lower alkoxy-lower alkyl, di(lower alkyl)amino-lower alkoxy-lower alkyl, lower-alkylamino-lower alkyl, di-lower alkyl amino-lower alkyl, amino-lower alkyl; and $R^3$ represents any of the R⁴ groups. These may be exemplified by piperidinyl; (lower alkyl)-piperidinyl [e.g., 2-, 3- or 4-(lower alkyl)piperidinyl]; (lower alkoxy)piperidinyl; pyrrolidinyl; (lower alkyl)-pyrrolidinyl; (lower alkoxy) pyrrolidinyl; piperazinyl; (lower alkyl)piperazinyl (e.g., $N^4$-methylpiperazinyl); di(lower alkyl)piperazinyl; (lower alkoxy)piperazinyl; (hydroxy-lower alkyl)piperazinyl [e.g., $N^4$-(2-hydroxyethyl)piperazinyl]; (lower alkanoyloxyalkyl)piperazinyl [e.g., $N^4$ - (2 - acetoxyethyl)piperazinyl]; (hydroxy-lower alkoxy-lower alkyl)piperazinyl [e.g., $N^4$-[2 - (2 - hydroxyethoxy)ethyl]piperazinyl]; di-(lower alkyl)amino-(lower alkoxy-lower alkyl)piperazinyl [e.g., $N^4$-[2-(2-dimethylaminoethoxy)ethyl]piperazinyl]; homopiperazinyl; amino(lower alkyl)piperidinyl [e.g., 3-(aminomethyl)piperidinyl], lower alkylamino (lower alkyl)piperidinyl [e.g., 2-[(methylamino)ethyl] piperidinyl], di-lower alkylamino(lower alkyl)piperidinyl [e.g., 4-[dimethylamino)methyl)]piperidinyl].

The salts of the compounds of this invention include the acid-addition salts, particularly the non-toxic acid-addition salts. Acids useful for preparing the acid-addition salts, include inter alia, inorganic acids, such as the hydrohalic acids (e.g., hydrochloric and hydrobromic acid), sulfuric acid, nitric acid and phosphoric acid, and organic acids, such as oxalic, maleic, fumaric, tartaric, citric, pamoic, acetic, and succinic acid.

As will be seen hereinafter, the compounds of the invention are prepared from starting materials of the structure

III

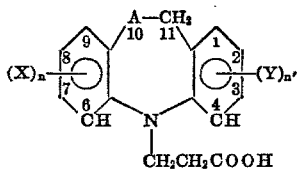

Where in the starting material II, $n$ is 1 or 2 and X includes a strongly electronegative group like trifluoromethyl, cyano, isocyanido or di-lower alkylsulfamoyl substituent at the 7-position, and $n'$ is 0, or Y is a substituent at a position other than 3 and 4 in the starting material, cyclization is directed to the 4-position so that the Type II isomer is subsequently formed. However, where X is an ortho-para orienting group like halogen, especially chlorine, and $n$ is 1 or 2 and at least one halogen is at the 7-position of starting material III, or Y is lower alkyl, lower alkyloxy, cycloalkyl or lower alkylmercapto at any position or a strongly electronegative group at a position other than 3, or when $n'$ is 0, a mixture of the Type I and Type II isomers is obtained.

Where in the starting material III, $n'$ is 1 or 2 and Y includes a strongly electronegative group like trifluoromethyl, cyano or di-lower alkylsulfamoyl at the 3-position, and $n$ is 0 or X is a substituent at a position other than 7 in the starting material, cyclization is directed to the 6-position so that the Type I isomer is subsequently formed.

Where in the starting material III, $n'$ is 1 or 2 and Y includes an ortho-para orienting substituent at the 3-position, and $n$ is 0, or X is a substituent at a position other than 7 in the starting material, cyclization is directed to the 6-position so that the Type I isomer is subsequently formed.

Where $n$ and $n'$ are 0, that is where there are no substituents on either aromatic ring, the Type I isomer is obtained, that is

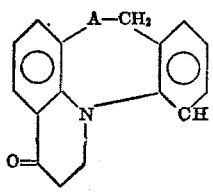

Where the starting material does not include substituents at the 3 and/or 7 positions, but does include substituents such as lower alkyl, lower alkyloxy, cycloalkyl or lower alkylmercapto at the 2, 8 and/or 9 positions, the Type I isomer is obtained.

Where the starting material does not include substituents at the 3 and/or 7 positions, but does include strongly electronegative groups at the 1 and/or 9 positions, the Type I isomer is obtained. However, where the starting material includes a strongly electronegative group at the 2 and/or 8 positions, then a mixture of the Type I and Type II isomers is obtained.

Where X represents a strongly electronegative group like trifluoromethyl, cyano or di-lower alkylsulfamoyl and $n$ is 1 or 2 at least one X being at the 7-position of the starting material and Y is lower alkyl, lower alkylmercapto, cycloalkyl or lower alkoxy at any position or any of the above strongly electronegative groups at a position other than 3 in the starting material and $n$ is 0, 1 or 2, the Type II isomer is obtained.

Where X is lower alkyl, lower alkyloxy, cycloalkyl, or lower alkylmercapto and $n$ is 1 or 2 and Y is halogen, trifluoromethyl, cyano, isocyanido or di-lower alkylsulfamoyl, and $n'$ is 1 or 2 at least one Y being at the 3-position of the starting material, the Type I isomer is obtained. In this case, X can be trifluoromethyl or other strongly electronegative group so long as it is not in the 7-position of the starting material as will be seen hereinafter.

Where X is lower alkyl, lower alkyloxy, cycloalkyl or lower alkylmercapto, and $n$ is 1 or 2 and $n'$ in $(Y)_{n'}$ is 0, the Type I isomer is obtained.

Where Y is lower alkyl, lower alkyloxy, cycloalkyl or lower alkylmercapto and $n'$ is 1 or 2 and the $n$ in $(X)_n$ is 0, the Type II isomer is obtained.

Where both X and Y represent lower alkyl, lower alkoxy and/or lower alkylmercapto, at least one of said groups being at the 3 and 7 positions of the starting material, the Type I isomer is obtained.

Preferred are those compounds of Formula I wherein $n=0$ and $n'=0$ and A=O; those compounds of Formula I wherein $n=0$, $n'=1$ and Y is Cl at the 11-position, and $n=1$, $n'=0$, and X is Cl at 4 position and A=O and those compounds of Formula II wherein $n=1$, X is $CF_3$ or Cl at the 11'-position, $n'=0$, and A=O.

The compounds of the invention of Formulae I and II can be prepared by reacting an oxime of Formula V or VI

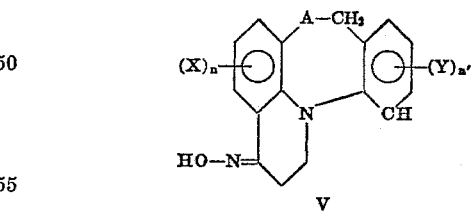

or

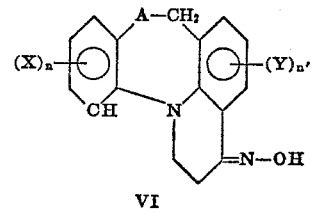

with a base like sodium hydride, sodium alkoxide, or potassium hydroxide to form the corresponding anion (structures VIII and IX below) and reacting the anion with a haloalkylamine or aminoalkyl-p-toluene sulphonate or haloalkenylamine or aminoalkenyl-p-toluenesulfonate of the structure

VII                    $Q—Z—NR^1R^2$ wherein Q is halogen or tosyloxy and Z and $R^1$ and $R^2$ are as defined above, however in this case $R^1$ and $R^2$ are other than hydrogen.

Compounds wherein one of the $R^1$ and $R^2$ groups is hydrogen are prepared in the following manner.

When the oxime, V or VI, or the anion thereof, is reacted with a haloalkylamine in which $R^1$ or $R^2$ is benzyl, then, that group in I or II can be selectively eliminated by reaction with a haloformate of the structure VIIa 

wherein $R_1$ is alkyl, aralkyl or aryl, such as ethyl chloroformate or benzyl chloroformate, to give I or II in which $R_1$ or $R_2$ is a carboethoxy group. The carboethoxy group can then be selectively replaced with hydrogen, by treatment with a halogen acid, e.g., hydrogen bromide.

When the oxime, V or VI, or the anion thereof is reacted with a haloalkylamine in which $R^1$ or $R^2$ is formyl, then that group in I or II can be selectively replaced with hydrogen by treatment with either mineral acid or inorganic base, e.g., hydrochloric acid or sodium hydroxide.

In the above methods, the oxime is first converted to an anion by reaction with a base such as sodium hydride in non-protic solvents like benzene, toluene, dimethylformamide, dimethylsulfoxide, tetrahydrofuran, or heptane, or with a base such as an alkali metal hydroxide, for example sodium hydroxide, in solvents such as acetone or 2-butanone, or with an alkali or alkaline earth metal alkoxide, e.g., sodium ethoxide, in a solvent such as dimethylformamide.

In another method, the anion

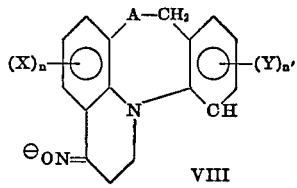

VIII or

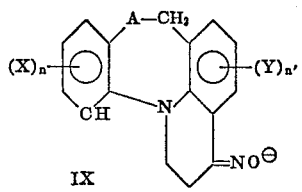

IX is reacted with a haloalkylene halide or haloalkyenylene halide of the structure Hal—Z—Hal' 

wherein Hal and Hal' can be Br and Cl, respectively, Cl and F respectively, I and Br, respectively, Br and F, respectively, etc. to form the corresponding ether of the structure

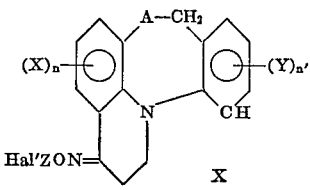

X or

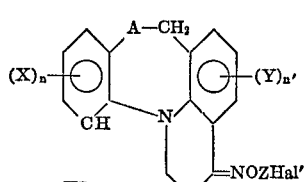

XI which is reacted with an amine of the structure

XII  HN$R^1R^2$ to form compounds of formula I and II.

In another method for preparing compounds of structures I and II, the 3-one or 3'-one

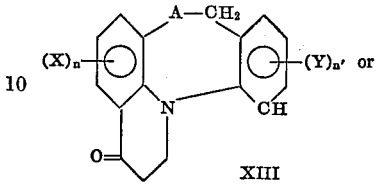

XIII or

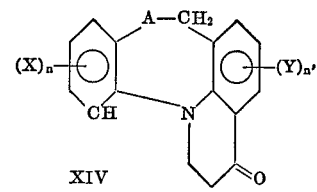

XIV are reacted with an aminoalkyleneoxyamine or aminoalkenyleneoxyamine of the structure

XV  $H_2NO—Z—NR^1R^2$

The 3-one starting materials (XIII and XIV) of the invention can be prepared by reacting a compound of the structure III 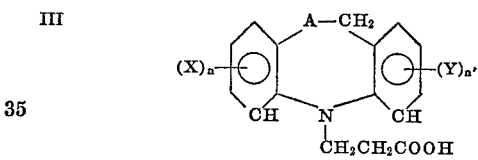

wherein X, Y, n, n', and A are as defined hereinbefore, with a phosphorus pentahalide, such as phosphorus pentachloride, in a molar ratio of III:pentahalide of within the range of from about 0.9:1 to about 1:1, in the absence of oxygen, and in the presence of an inert solvent, such as benzene, toluene, xylene, pentane, hexane, etc., at a temperature within the range of from about 0 to about 10° C., to form an acyl halide of the structure

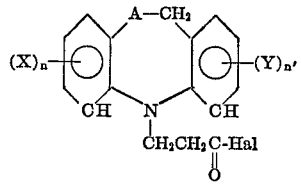

XVI

The acyl halide XVI is reacted with anhydrous stannic chloride in a molar ratio of acyl halide XVI:stannic chloride within the range of from about 0.4:1 to about 1:1, at a temperature within the range of from about 20° to about 30° C. to form the formula XIII and XIV, 3 or 3'-one compounds depending upon the nature and the position of the X and Y substituents.

The compounds of formula XIII and/or XIV can also be prepared by reacting the starting material II 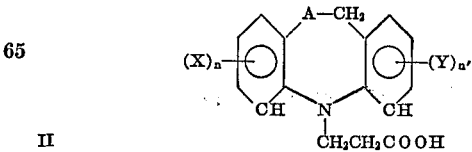

with trifluoroacetic anhydride or phosphorus pentoxide, in a molar ratio of III:trifluoroacetic anhydride, or phosphorus pentoxide within the range of from about 0.9:1 to about 1:1, in the presence of an inert solvent such as benzene, toluene, xylene, pentane, hexane, etc., at a temperature within the range of from about 10° to about 80°

C., or with polyphosphoric acid (PPA) in a molar ratio of III:PPA of within the range of from about 1:10 to about 1:25.

The ketones of formulae XIII and XIV react with hydroxylamine or the hydrohalide salt thereof in the presence of a solvent such as ethanol, methanol, etc., to give the corresponding oxime starting materials (V and VI), that is

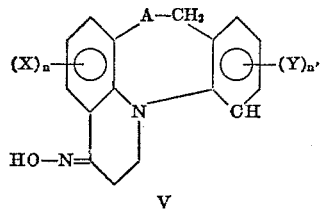

V or

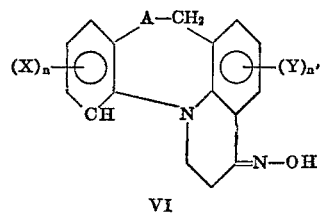

VI

The starting materials of formula III are prepared by a sequence of reactions. One step comprises reacting compounds having the formula:

XVII

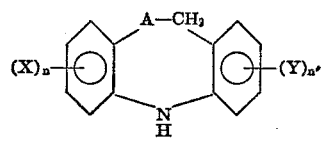

with acrylonitrile to yield compounds of formula XVIII

XVIII

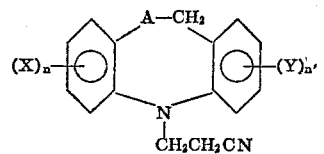

wherein n, n', X, Y and A are as defined herein.

This reaction is carried out by employing an excess of the acrylonitrile as the solvent. The temperature utilized in the reaction can be varied from about 0° to about 100° C. with the preferred range being between about 0° and about 75° C. This reaction proceeds expeditiously when a small amount (up to about 1%) of a strong base like sodium hydroxide, sodium methoxide, potassium t-butoxide, or benzyl trimethylammonium hydroxide (Triton B) is used as the catalyst.

The next step for preparing compounds of formula III is to treat the compounds of structure XVIII with alcoholic hydrogen halide, such as hydrogen chloride in methanol, ethanol, and so forth, at room temperature whereby esters of the structure XIX are formed.

XIX

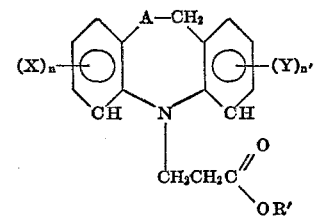

wherein R' is lower alkyl.

By saponifying compound XIX with an alkali metal hydroxide, e.g., potassium hydroxide, lithium hydroxide, and so forth, the desired carboxylic acids of structure III can be obtained.

Examples of compounds of formula XVII where A is S are set out in U.S. Patents Nos. 3,188,321 and 3,188,322.

Examples of compounds of Formula XVIII where A is O or S can be found in a paper entitled Novel Polycyclic Heterocycles, by Yale et al., J. Med. Chem. 13, 713 (1970).

Examples of starting materials which can be employed in preparing the compounds of the invention include, but are not limited to, the following wherein A can be O or S.

1.

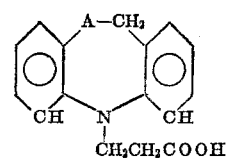

2.

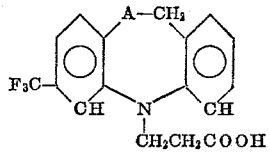

3.

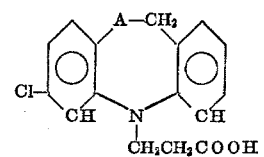

4.

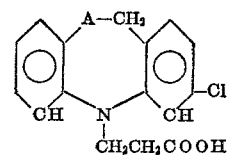

5.

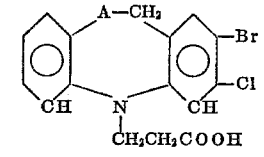

6.

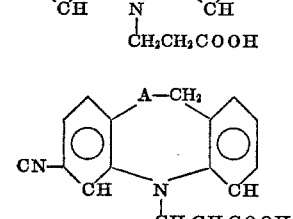

7.

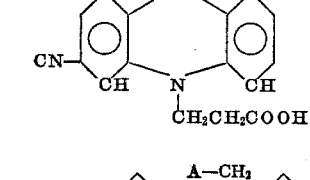

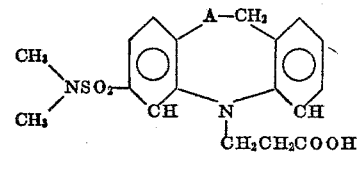

8.

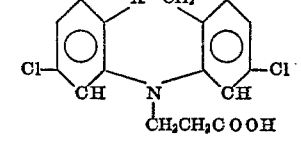

9.  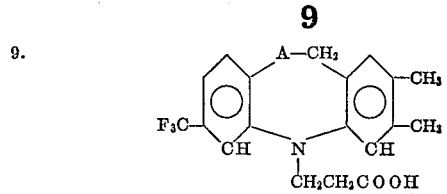
10. 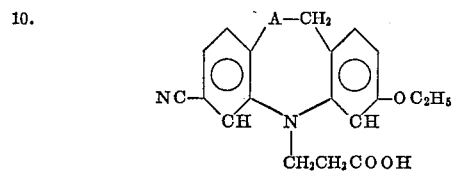
11. 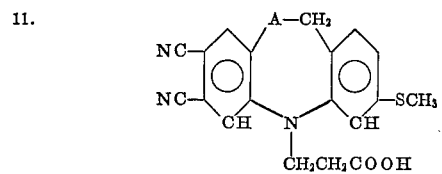
12. 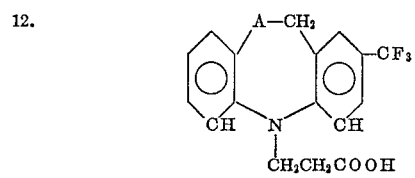
13. 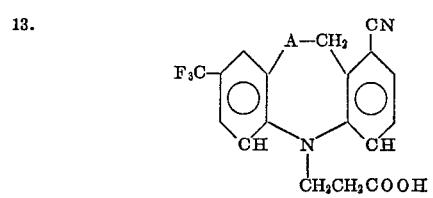
14. 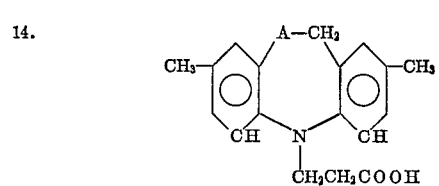
15. 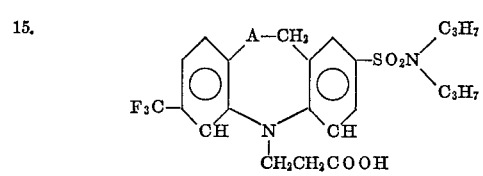
16. 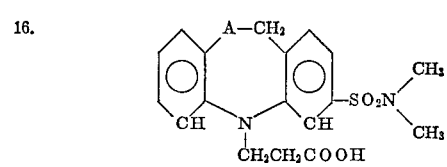
17. 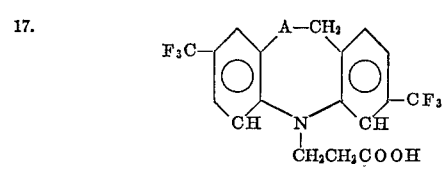
18. 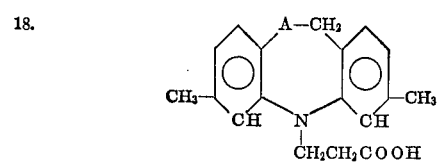

19. 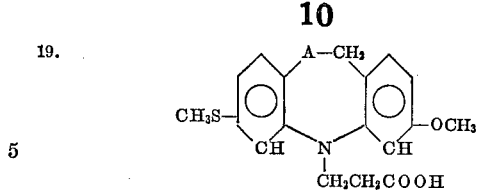
20. 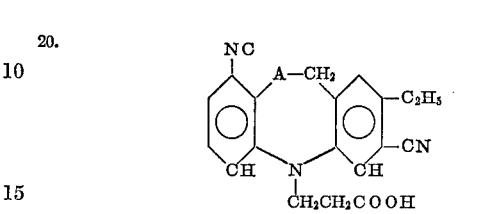
21. 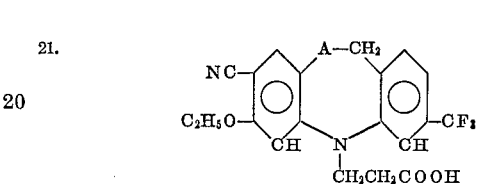
22. 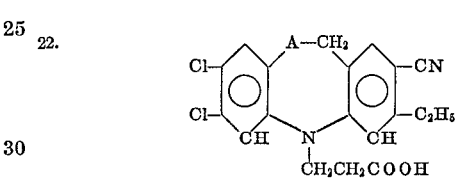
23. 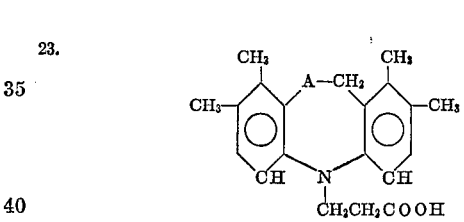

Compounds of this invention are therapeutically active compounds which are utilizable as central nervous system depressants, as muscle relaxants and an anti-inflammatory agents. For these purposes, they may be administered orally or parenterally in such form as tablets, capsules, injectables, or the like by incorporating the appropriate dosage of the compound with carriers according to accepted pharmaceutical practices.

The new compounds of formulae I and II are also useful as antimicrobial agents and may be used to combat infections in animal species, such as mice, rats, dogs, guinea pigs and the like, due to organisms such as *Trichomonas vaginalis, Trichomonas foetus, Staphyloccocus aureus, Salmonella schottmuelleri, Klebsiella pneumoniae, Proteus vulgaris, Escherichia coli, C. albicans* or *Trichophyton mentagrophytes*. For example, a compound or mixture of compounds of formulae I and II may be administered orally to an infected animal, e.g., to a mouse, in an amount of about 5 to 25 mg. per kg. per day in 2 to 4 divided doses. These may be conventionally formulated in a tablet, capsule or elixir containing about 10 to 250 mg. per dosage unit, by compounding the active substance or substances with the conventional excipient, vehicle, binder, preservative, flavor, etc., as called for by accepted pharmaceutical practice. They may also be applied topically, e.g., to dermatophytosis in a guinea pig, in a lotion, salve or cream at a concentration of about 0.01 to 3 percent by weight.

They may also be used as surface disinfectants. About 0.01 to 1 percent by weight of any of these substances may be dispersed on an inert solid or in a liquid such as water and applied as a dust or spray. They may be incorporated also, for example, in a soap or other cleansing agent, e.g., a solid or liquid detergent, detergent composition, for example, in general cleaning, in cleaning dairy barns or equipment or cleaning food handling or processing equipment.

EXAMPLE 1

1,2 - dihydro-11-(trifluoromethyl)-3$\underline{H}$,7$\underline{H}$-quino[8,1-cd][1,5]-benzoxazepin-3-one, [3-(4-methyl-1-piperazinyl)propyl]-oxime, dihydrochloride I. 1,2-dihydro-11-(trifluoromethyl)-3$\underline{H}$,7$\underline{H}$-quino[8,1-cd][1,5]benzoxazepin-3-one A. 5,11 - dihydro-7-(trifluoromethyl)dibenz[b,e][1,4]oxazepine-5-propionic acid: To 50.0 g. of 5,11-dihydro-7-(trifluoromethyl)dibenz-[b,e][1,4]oxazepine in 60 ml. of distilled acrylonitrile is added in 5 minutes 0.80 ml. of Triton B. Subsequently, the mixture is heated for one hour under reflux and the product isolated by extraction with benzene to give 5,11 - dihydro-7-(trifluoromethyl) dibenz[b,e][1,4]oxazepine - 5 - propionitrile, M.P. about 161–163°.

7 - (trifluoromethyl) - 5,11 - dihydrodizenz[b,e][1,4]oxazepine-5-propionitrile, 15.0 g., is dissolved in 240 ml. of dry dioxane and to this 140 ml. of 30% methanolic hydrogen chloride is added. The solution is stirred for 36 hours, 6 ml. of $H_2O$ is added, stirred 0.5 hour, and then concentrated in vacuo to 120 ml. The solid is filtered, and the filtrate is concentrated to dryness in vacuo. The residual liquid is taken up in 200 ml. of diethyl ether, treated with Darco and Hyflo, the diethyl ether solution is concentrated and the residue distilled in vacuo to give 5,11-dihydro - 7-(trifluoromethyl)dibenz[b,e][1,4]-oxazepine-5-propionic acid, methyl ester, B.P. about 166–168° (0.08 mm.), M.P. about 70.0–71.5°.

7 - (trifluoromethyl) - 5,11-dihydrodibenz[b,e][1,4]oxazepine-5-propionic acid, methyl ester, 31.5 g., is dissolved in 3 liters of methanol and to this 5.0 g. of potassium hydroxide dissolved in 250 ml. of water is added. The mixture is refluxed for 2.5 hours and then concentrated in vacuo. The residue is taken up in 2.5 liters of water and this solution is acidified with 2% aqueous HCl to give 25.3 g. of 5,11-dihydro-7-(trifluoromethyl)dibenz[b,e][1,4]-oxazepine-5-propionic acid, M.P. about 94–96°.

B. 1,2 - dihydro - 11 - (trifluoromethyl)-3$\underline{H}$,7$\underline{H}$-quino[8,1-cd][1,5]benzoxazepin-3-one: A solution of 6.86 g. of 5,11 - dihydro - 7-(trifluoromethyl)-dibenz[b,e][1,4]oxazepine-5-propionic acid in 50 ml. of benzene is cooled to 5–10°. To this is added dropwise with stirring a solution of 4.6 g. of $PCl_5$ in 25 ml. of benzene over a period of 15 minutes. The solution is stirred at 25° for 40 minutes and then at 40–50° for another 20 minutes. The reaction mixture is then heated at 55° for 10 minutes, cooled to 10° and to this is added dropwise with stirring a solution of 12.0 g. anhydrous $SnCl_4$ in 20 minutes at room temperature; 100 ml. of ether are added, followed by 10 ml. of concentrated hydrochloric acid, and then 100 ml. of water. After stirring vigorously for 10 minutes, the organic phase is separated, and the aqueous phase is extracted with 100 ml. of ether. The combined organic extracts are washed, dried, filtered, and concentrated to dryness to give 6.9 g. of residue; this is crystallized from 2-propanol to give 4.3 g. of product, M.P. about 140–142°.

II. 1,2-dihydro-11-(trifluoromethyl)-3$\underline{H}$,7$\underline{H}$-quino[8,1-cd][1,5]benzoxazepin-3-one, oxime A solution of 28.0 g. of the ketone from part I(B), and 13.6 g. of hydroxylamine hydrochloride in 600 ml. of warm 70% ethanol is refluxed for 4 hours, and kept at room temperature to give a pale yellow crystalline solid. This is filtered and recrystallized from 70% ethanol to give 21.0 g. of the product, M.P. about 198–200° (dec.).

III. 1,2 - dihydro - 11 - (trifluoromethyl)-3$\underline{H}$,7$\underline{H}$-quino[8,1-cd][1,5]benzoxazepin - 3 - one, [3-(4-methyl)-1-piperazinyl)propyl]-oxime, dihydrochloride To a suspension of 6.0 g. of the oxime from Example 1, Part II in 100 ml. of anhydrous toluene is added 1.0 g. of 50% sodium hydride and the mixture is heated under reflux for 1.5 hours. To this, at 10° is added, dropwise, a solution of 4.9 g. of 1-(3-chloropropyl)-4-methylpiperazine in 20 ml. of toluene. The mixture is then heated under reflux for 4 hours, filtered and the filtrate concentrated to dryness in vacuo to give 10.1 g. of residue. This is dissolved in 30 ml. of 2-propanol and to this is added 16 ml. of 4.8 N 2-propanolic hydrogen chloride to give 11.4 g. of material, M.P. about 220–224° (dec.). This is recrystallized from 2-propanol to give 9.8 g. of the product, M.P. about 235–237°.

EXAMPLE 2

1,2-dihydro - 11 - (trifluoromethyl)-3$\underline{H}$-7$\underline{H}$-quino[8,1-cd][1,5]benzoxazepin - 3 - one, [2-(1-pyrrolidinyl)ethyl] oxime, hydrochloride To the sodium salt prepared as shown in Example 1, Part III from the 3.6 g. of the oxime (Example 1, Part II), 70 ml. of toluene and 0.65 g. of sodium hydride, is added 2 - (1-pyrrolidinyl)ethyl-$p$-toluenesulphonate in toluene. The reaction mixture is heated under reflux for 4 hours, then cooled, washed with water, then saturated NaCl, dried and concentrated in vacuo. The residue, 4.9 g. of solid, is recrystallized from hexane to give 4.3 g. of base, M.P. about 117–119°. This is converted to its hydrochloric acid salt by treating with 2-propanolic hydrogen chloride. Recrystallization from 2-propanol gives 4.3 g. of the product, M.P. about 212–214° (dec.).

EXAMPLE 3

1,2 - dihydro-11-(trifluoromethyl)-3$\underline{H}$,7$\underline{H}$-quino-[8,1-cd][1,5]-benzoxazepin-3-one, [3-(dimethylamino)propyl] oxime, hydrochloride To sodium ethoxide (from 0.5 g. of sodium in 40 ml. of absolute EtOH) is added 5.35 g. of the oxime (Example 1, Part II), and the mixture heated under reflux for 2 hours. The solvent is removed and 10 ml. of $N,N$-dimethylformamide is added and again concentrated to dryness. The residue is dissolved in 80 ml. of $N,N$-dimethylformamide and to the solution is added 4.0 g. of 3-chloro-$N,N$-dimethylpropylamine in 10 ml. of the same solvent. The reaction mixture is heated at 100–110° for 4 hours and the solvent removed in vacuo. The residue is distributed between ether-$H_2O$, the ether layer is separated, the aqueous phase extracted with ether. The combined extracts are concentrated in vacuo to give a residual solid. This is recrystallized from hexane to give 6.4 g. of the base, M.P. 94–96°, and this gives 6.7 g. of the hydrochloride, M.P. about 198–200° (dec.). This is recrystallized from 2-PrOH to give 5.2 g. of the product, M.P. about 203–204° (dec.).

EXAMPLE 4

1,2 - dihydro-11-(trifluoromethyl)-3$\underline{H}$,7$\underline{H}$-quino-[8,1-cd][1,5]-benzoxazepin - 3 - one [2-(1-morpholinyl)ethyl] oxime, hydrochloride A mixture of 5.3 g. of the oxime (Example 1, Part II), 4.5 g. of 1-(2-chloroethyl)morpholine, and 5.0 g. of powdered sodium hydroxide in 80 ml. of acetone, is heated under reflux for 8 hours. The reaction mixture is cooled, filtered and the insoluble cake is washed with 20 ml. of acetone. The filtrate is concentrated to dryness and the residue is dissolved in 200 ml. of ether. The solution is washed, dried, and concentrated in vacuo to give a residual solid. This is recrystallized from hexane to give 7.8 g. of the colorless crystalline base, M.P. about 110–112°. The base is converted to its hydrochloride and the salt is recrystallized from 2-PrOH to give 6.3 g. of the product, M.P. about 208–210° (dec.).

EXAMPLE 5

1,2-dihydro - 3H,8H - quino[1,8-ab][4,1]benzothiazepin-3-one [2-(N-benzyl - N - methylamino)ethyl]oxime, hydrochloride By following the procedure given in Example 1, Part III, but replacing the 1,2-dihydro-11-(trifluoromethyl)-3H,7H-quino[8,1-cd][1,5]benzoxazepin - 3 - one, oxime and 1-(3-chloropropyl)-4-methylpiperazine with 1,2-dihydro - 3H,8H - quino[1,8-ab][4,1]benzothiazepin - 3 - one, oxime and N-(2-chloroethyl) - N - methylbenzylamine respectively, there is obtained 1,2-dihydro - 3H,8H - quino[1,8-ab][4,1]benzothiazepin-3-one [2-(N-benzyl-N-methylamino)ethyl]oxime, hydrochloride.

1,2 - dihydro-3H,8H-quino[1,8-ab][4,1]benzothiazepin-3-one, oxime is prepared as follows:

A. 5,11 - dihydrodibenzo[b,e][1,4]thiazepine - 5 - propionic acid: A suspension of 21.3 g. of 5,11-dihydrodibenzo[b,e][1,4]thiazepine in 55 ml. of acrylonitrile is cooled to 0–5°. To this is added dropwise 0.3 ml. of Triton B. The temperature rises slowly from 3° to 14° and then rapidly to 45° within 5 minutes with the formation of red colored clear solution. The mixture is cooled to 5–10°, stirred for 5 minutes, allowed to come to room temperature and then heated under reflux for 1.5 hours. The excess of acrylonitrile is removed *in vacuo*; the residue is extracted with 3–350 ml. portions of diethyl ether; the combined ether extracts are decolorized and concentrated to give 27.1 g. of 5,11-dihydrodibenzo[b,e][1,4]thiazepine-5-propionitrile.

To the 5,11-dihydrodibenzo[b,e][1,4]thiazepine-5-propionitrile, 71.1 g. in 1200 ml. of dry dioxane is added 800 ml. of 30% methanolic hydrogen chloride. The solution is stirred for 72 hours; 30 ml. of water is added; the mixture is stirred for 0.5 hour, concentrated *in vacuo* to about 400 ml., filtered, and the filtrate concentrated to dryness *in vacuo*. The residue solidifies on keeping to yield methyl 5,11-dihydrodibenzo[b,e][1,4]thiazepine - 5 - propionate.

To the methyl 5,11 - dihydrodibenzo[b,e][1,4]thiazepine-5-propionate, 25.4 g., in 2200 ml. of methanol is added a solution of 5.6 g. of potassium hydroxide in 300 ml. of water. The mixture is heated under reflux for 4 hours, and then is concentrated *in vacuo*. The residue is taken up in 600 ml. of water, cooled, and then acidified with 2% aqueous hydrochloride acid. The solid is filtered and recrystallized from benzene to yield 5,11-dihydrodibenzo[b,e][1,4]thiazepine-5-propionic acid.

B. 1,2-dihydro - 3H,8H - quino[1,8-ab][4,1]-benzothiazepin-3-one: 5,11-dihydro[b,e][1,4]thiazepine - 5 - propionic acid, 3.7 g., is dissolved in 20 ml. of benzene and to the solution at 20° is added dropwise, 2.8 g. of trifluoroacetic anhydride. The reaction mixture is heated under reflux for 5 minutes, poured into 250 ml. of cold water, and extracted with 150 ml. of benzene. The benzene solution is concentrated to dryness, and the residue is recrystallized from 2-propanol to give about 2.3 g. of product.

C. 1,2-dihydro - 3H,8H - quino[1,8-ab][4,1] benzothiazepine-3-one, oxime: A solution of 26.7 g. of 1,2-dihydro-3H,8H-quino[1,8-ab[4,1]benzothiazepin-3-one, and 13.9 g. of hydroxylamine hydrochloride in 600 ml. of warm 70% ethanol is refluxed for 4 hours, and kept at room temperature to give a pale yellow crystalline solid. This is filtered and recrystallized from 70% ethanol to give 20.2 g. of the oxime.

EXAMPLE 6

1,2-dihydro - 3H,8H - quino[1,8-ab][4,1]benzothiazepin-3-one, [2-(methylamino)ethyl]oxime, dihydrobromide A solution of 18.0 g. of 1,2-dihydro-3H,8H-quino[1,8-ab][4,1]benzothiazepin-3-one, [2 - (N-benzyl-N-methylamino)-ethyl]oxime hydrochloride (Example 5) in 500 ml. of water is made alkaline with 50% sodium hydroxide solution. The free amine is extracted with benzene, washed and dried. To this 9.0 g. of ethyl chloroformate is added and the mixture is heated under reflux for 18 hours, cooled, and washed with 50 ml. of cold 5% aqueous hydrochloric acid, 50 ml. of water, dried and concentrated to give about 23.0 g. of a viscous residue of the intermediate carbethoxy derivative. This is dissolved in 25 ml. of cold glacial acetic acid and to the solution, at 10°, is added 70 ml. of a 30% solution of hydrogen bromide in glacial acetic acid. The mixture is stirred at 20° for 48 hours. To this is added 500 ml. of anhydrous ether, when the product separates. This is isolated and washed with anhydrous ether and finally triturated with anhydrous acetone to give about 21.0 g. of a solid, which is recrystallized from 2-PrOH to give about 14.0 g. of the product.

EXAMPLE 7

11-chloro-1,2 - dihydro - 3H,8H-quino[1,8-ab][4,1]benzoxazepin-3-one, [3-(4-(2-hydroxyethyl) - 1-piperazinyl)propyl]oxime, dimaleate I. 11-chloro-1,2-dihydro-3H,8H-quino[1,8-ab][4,1]-benzoxazepin-3-one A. 3-chloro-5,11 - dihydrodibenz[b,e][1,4]oxazepine-5-propionic acid: A suspension of 24.4 g. of 3-chloro-5,11-dihydrodibenz[b,e][1,4]oxazepine in 55 ml. of acrylonitrile is cooled to 0–5°. To this is added with efficient stirring, and cooling, 0.3 ml. of Triton B, pausing after each drop of addition. The temperature rises slowly from 3° to 14° and then rapidly to 45° within 5 minutes with the formation of red colored clear solution. The mixture is cooled to 5–10°, stirred for 5 minutes, allowed to come to room temperature and then slowly heated to reflux temperature. After 1 hour heating under reflux, the excess of acrylonitrile is removed *in vacuo*. The residue is extracted with 3–350 ml. portions of diethyl ether, the combined diethyl ether extracts are treated with 3.0 g. of Darco and 1.0 g. of Hyflo, filtered, the filtrate is dried, and concentrated to give 31.6 g. of 3-chloro-5,11-dihydrodibenz[b,e][1,4]oxazepine - 5-propionitrile, B.P. about 200–210° (0.2 min.).

The 3-chloro-5,11-dihydrodibenz[b,e][1,4]oxazepine-5-propionitrile, 71.1 g., is dissolved in 1200 ml. of dry dioxane and to this 800 ml. of 30% methanolic hydrogen chloride is added. The solution is stirred for 72 hours, 30 ml. of $H_2O$ is added, the mixture is stirred for 0.5 hour, concentrated *in vacuo* to 400 ml., filtered, and the filtrate concentrated to dryness *in vacuo*. The residue solidifies on keeping to yield 3-chloro-5,11-dihydrodibenz[b,e][1,4]oxazepine-5-propionic acid, methyl ester.

The 3-chloro-5,11-dihydrodibenz[b,e][1,4]oxazepine-5-propionic acid, methyl ester, 25.4 g., is dissolved in 2200 ml. of MeOH and to this 5.6 g. of KOH dissolved in 300 ml. of $H_2O$ is added. The solution is refluxed for 4 hours, and then is concentrated *in vacuo*. The residue is taken up in 600 ml. of $H_2O$, the solution is cooled, and then acidified with 2% aqueous HCl. The solid is filtered and dissolved in 600 ml. of $C_6H_6$. This solution is treated with Darco and then extracted with 600 ml. of 2% aqueous NaOH solution. The extracts are treated with Darco and Hyflo, filtered and the filtrate is acidified with 2% aqueous HCl. The solid is filtered and recrystallized from $C_6H_6$ to yield 3-chloro-5,11-dihydrodibenz[b,e][1,4]oxazepine-5-propionic acid, M.P. about 138–140°.

B. 11-chloro-1,2-dihydro-3H,8H - quino[1,8-ab][4,1]-benzoxazepin-3-one: 3.7 g. of 3-chloro-5,11-dihydro[b,e][1,4]oxazepine-5-propionic acid is dissolved in 20 ml. of warm benzene and the resulting colorless solution is allowed to come to 30°, and to this, 1.9 ml. (2.8 g.) of $(CF_3CO)_2O$ is added dropwise. The reaction mixture is slowly heated to reflux, the reflux is maintained for 5 minutes, and the mixture is poured into 250 ml. of cold water. To this, 150 ml. of benzene is added, and stirred for a few minutes. The benzene layer is separated, washed, dried, filtered, and concentrated to dryness. The residue is recrystallized first from 2-propanol and then from cyclohexane to give 2.3 g. of product, M.P. about 142–144°.

II. 11-chloro-1,2-dihydro-3H,8H-quino[1,8-ab][4,1]-benzoxazepin-3-one, oxime

A solution of 1.1 g. of the ketone from Example 3 and 0.54 g. of hydroxylamine hydrochloride in 40 ml. of 70% ethanol is refluxed for 4 hours, cooled and the solid filtered. The solid is recrystallized from 70% ethanol to give 800 mg. of product, M.P. about 158–161° (dec.).

III. 11-chloro-1,2-dihydro - 3H,8H - quino[1,8-ab][4,1]-benzoxazepin-3-one, [3-(4-(2 - hydroxyethyl)-1-piperazinyl)propyl]oxime, dimaleate A mixture of 5.1 g. of 11-chloro-1,2-dihydro-3H,8H-quino[1,8-ab][4,1]benzoxazepin-3-one, oxime, 7.2 g. of 1-bromo-3-chloropropane, 5.0 g. of powdered sodium hydroxide in 100 ml. of 2-butanone is heated while stirring under reflux for 24 hours. The mixture is cooled, and slowly, while stirring, 10 ml. of $H_2O$ is added. The aqueous phase is separated and extracted with 30 ml. of 2-butanone. The combined 2-butanone extracts are concentrated to dryness in vacuo, the residue is dissolved in 100 ml. of toluene, and the solution is treated with 4.1 g. of 1-piperazine-ethanol, followed by 5.6 g. of $K_2CO_3$, and 0.3 g. of copper bronze. The mixture is heated under reflux for 8 hours, cooled, filtered and the filtrate concentrated to dryness in vacuo to give 8.0 g. of residue. This is dissolved in 100 ml. of 2-PrOH and to this is added a solution of 3.5 g. of maleic acid in 20 ml. of 2-PrOH. The crystalline solid that separates is recrystallized from 2-PrOH to give 8.9 g. of the product.

EXAMPLE 8

1,2 - dihydro-11-(trifluoromethyl)-3H,7H-quino[8,1-cd][1,5]-benzoxazepin-3-one, [2-(dimethylamino)ethyl] oxime hydrochloride A mixture of 9.6 g. of 1,2-dihydro-11-(trifluoromethyl)-3H,7H-quino[8,1 - cd][1,5]benzoxazepin-3-one, 11.4 g. of β-dimethylaminoethoxyamine dihydrochloride, 20 ml. of pyridine, and 40 ml. of absolute ethanol is refluxed for 24 hours and then concentrated to dryness in vacuo. The residue is warmed with 100 ml. of 2 N aqueous hydrochloric acid, then cooled, made alkaline with 50% aqueous NaOH and the oil extracted with 300 ml. of ether. The ether solution is treated with 15 ml. of 4.8 N 2-propanolic hydrogen chloride, the solid is filtered and recrystallized from 2-propanol to give 10.8 g. of the product, M.P. about 218–220° (dec.).

EXAMPLE 9

1,2 - dihydro-11-(trifluoromethyl)-3H,7H-quino[8,1-cd] [1,5] - benzoxazepine-3-one, [2-(4-methyl)-1-piperazinyl)ethyl]oxime, dihydrochloride By following the procedure described in Example 1, but replacing the 1-(3-chloropropyl)-4-methylpiperazine with 1-(2-chloroethyl)-4-methylpiperazine, there is obtained the product, M.P. about 241–243° (dec.).

EXAMPLE 10

1,2 - dihydro-11-(trifluoromethyl)-3H,7H-quino[8,1-cd] [1,5] - benzoxazepin-3-one, [2-(1-piperidinyl)ethyl] oxime, hydrochloride By following the procedure described in Example 1, but replacing the 1-(3-chloropropyl)-4-methylpiperazine with 1-(2-chloroethyl)piperidine, there is obtained the product, M.P. about 211–213° (dec.).

EXAMPLE 11

1,2 - dihydro-11-(trifluoromethyl)-3H,7H-quino[8,1-cd] [1,5]-benzoxazepin-3-one, [2-(hexahydro-1H-azepin-1-yl)ethyl]oxime, hydrochloride Following the procedure described in Example 1, but substituting 1-(3-chloropropyl)-4-methylpiperazine with 1-(2-chloroethyl)hexahydro-1H-azepine, there is obtained the title product, M.P. about 198–200° (dec.).

EXAMPLE 12

1,2 - dihydro-11-(trifluoromethyl)-3H,7H-quino[8,1-cd] [1,5]-benzoxazepine - 3 - one,[2-(dimethylamino)-2-methylethyl]oxime, oxalate By following the method described in Example 4, but replacing the 1-(2-chloroethyl)morpholine with dimethylaminoisopropyl chloride, there is obtained the base, and this then is converted to the oxalate. The latter, on recrystallization from ethyl acetate gives the product, M.P. about 105–108° (dec.).

EXAMPLE 13

1,2-dihydro - 11 - (trifluoromethyl)-3H,7H-quino[8,1-cd] [1,5] - benzoxazepine-3-one, [2-(N-benzyl-N-methyl) amino)ethyl]-oxime, hydrochloride By following the procedure in Example 1, but substituting the 1-(3-chloropropyl)-4-methylpiperazine with N-(2-chloroethyl)-N-methyl benzylamine, there is obtained the product, M.P. about 184–186° (dec.).

EXAMPLE 14

4-chloro - 1,2 - dihydro - 3H,8H - quino[1,8-ab][4,1] benzoxazepin - 3 - one[3 - (dimethylamino)propyl] oxime, hydrochloride By following the procedure given in Example 3, but substituting 1,2 - dihydro-11-(trifluoromethyl)-3H,7H-quino[8,1-cd][1,5]benzoxazepin-3-one, oxime with 4-chloro - 1,2 - dihydro-3H,8H-quino[1,8-ab][4,1]benzazepin-3-one, oxime, there is obtained 4-chloro-1,2-dihydro-3H,8H-quino[1,8-ab][4,1]benzoxazepin - 3 - one,[3-(dimethylamino)-propyl]oxime hydrochloride. 4-Chloro-1,2-dihydro - 3H,8H - quino[1,8-ab][4,1]benzoxazepin-3-one, oxime is prepared as follows:

A suspension of 17.4 g. of 7-chloro-5,11-dihydrodibenz[b,e][1,4]oxazepine in 35 ml. of acrylonitrile is cooled to 0–5. To this is added with efficient stirring and cooling 0.2 ml. of Triton B. The suspension becomes homogeneous and a red solution results with the rise of temperature to 10°. The reaction mixture is allowed to come to room temperature and then refluxed for one hour with stirring. The excess of acrylonitrile is removed by known means, water is added, and the solid is filtered. The solid is dried, powdered, and extracted with five 400 ml. portions of diethyl ether. The diethyl ether extracts are dried and concentrated to a volume of 250 ml. The white crystalline compound is filtered. The filtrate is again concentrated and the resulting solid is filtered. The yield of the combined desired products (i.e., 7-chloro-5,11-dihydrodibenz[b,e][1,4]oxazepine-5-propionitrile) is 21.5 g., M.P. about 131–132°.

The 7-chloro-5,11 - dihydrodibenz[b,e][1,4]oxazepine-5-propionitrile, 71.10 g., is dissolved in 1200 ml. of dry dioxane and to this 800 ml. of 30% methanolic hydrogen chloride is added. The solution is stirred for 72 hours, 30 ml. of water is added, the mixture is stirred for 0.5 hour, concentrated in vacuo to 400 ml., filtered, and the filtrate concentrated to dryness in vacuo. The residue solidifies on keeping to yield 7-chloro-5,11 - dihydrodibenz[b,e][1,4] oxazepine-5-propionic acid, methyl ester, 67.5 g., M.P. about 70–72°.

The 7-chloro-5,11-dihydrodibenz[b,e][1,4]oxazepine-5-propionic acid, methyl ester, 25.4 g., is dissolved in 2200 ml. of MeOH and to this 5.6 g. of KOH dissolved in 300 ml. of water is added. The solution is refluxed for 4 hours, and then is concentrated *in vacuo*. The residue is taken up in 600 ml. of water, the solution is cooled, and then acidified with 2% aqueous HCl. The solid is filtered and dissolved in 600 ml. of $C_6H_6$. This solution is treated with Darco and then extracted with 600 ml. of 2% aqueous NaOH solution. The extracts are treated with Darco and Hyflo, filtered and the filtrate is acidified with 2% aqueous HCl. The solid is filtered and recrystallized from $C_6H_6$. The yield of 7-chloro-5,11-dihydrodibenz[b,e]-[1,4]oxazepine-5-propionic acid is 23.0 g. M.P. about 155.0–156.5°.

A solution of 7.35 g. of 7-chloro-5,11-dihydrodibenz[b,e][1,4]oxazepine-5-propionic acid in 40 ml. of warm benzene is slowly cooled to 35° and while stirring 3.8 ml. of $(CF_3CO)_2O$ is added dropwise. The reaction mixture is heated to reflux and the reflux is maintained for 5 minutes. To this 50 ml. of benzene is added and the solution is poured into cold water. The yellow benzene layer is separated and the aqueous phase is extracted with 50 ml of benzene. The combined benzene extracts are washed, dried, and concentrated to dryness under reduced pressure. The residue solidifies to an intense yellow material, which weighs about 7.0 g., M.P. about 110–120°. This solid is dissolved in 325 ml. of a refluxing mixture of 2-propanol and cyclohexane (2:3), and kept at room temperature for two days, when two different kinds of crystals form. These are filtered and the intense yellow transparent rhombic crystals (compound A) are separated manually from the darker yellow flat needles (compound B). Compound A melts at about 140–142° and weighs about 1.3 g. while compound B melts at 137–143° and weighs about 3.4 g.

Compound A, 1.3 g. is dissolved in 75 ml. of a refluxing mixture of 2-propanol and cyclohexane (1:4), filtered, and kept at room temperature. This gives about 1.1 g. of intense yellow transparent needles M.P. about 140–142.5°. This compound is shown to be 11-chloro-1,2-dihydro-3H,7H-quino[8,1-cd][1,5]benzoxazepine-3-one.

Compound B is dissolved in 225 ml. of a refluxing mixture of 2-propanol and cyclohexane (1:4), filtered and kept at room temperature to give about 2.7 g. of darker yellow non-transparent long needles, M.P. about 141.5–144°. This compound is shown to be 4-chloro-1,2-dihydro-3H,8H-[1,8-ab][4,1]benzoxazepin-3-one.

11-chloro-1,2-dihydro-3H,7H-quino[8,1-cd][1,5]benzoxazepin-3-one, oxime

A mixture of 36.0 g. of 11-chloro-1,2-dihydro-3H,7H-quino[8,1-cd][1,5]benzoxazepine-3-one (Compound A from Example 12) and 17.5 g. of hydroxylamine hydrochloride is dissolved in 2 liters of warm 70% ethanol and refluxed for three hours. The reaction mixture is concentrated to 1.5 liters and allowed to cool. The resulting pale yellow needles are filtered and recrystallized from 70% ethanol to give about 28.5 g. of product, M.P. about 224–226° (dec.).

4-chloro-1,2-dihydro-3H,8H-quino[1,8-ab][4,1]benzoxazepin-3-one, oxime

A mixture of 13.0 g. of 4-chloro-1,2-dihydro-3H,8H-quino[1,8-ab][4,1]benzoxazepin-3-one (Compound B from Example 12), and 6.3 g. of hydroxylamine hydrochloride in 1400 ml. of warm 70% ethanol is refluxed for three hours. The reaction mixture is allowed to cool. The resulting pale yellow needles are filtered and recrystallized from 80% ethanol to give about 11.0 g. of product, M.P. about 252–254° (dec.).

EXAMPLE 15

11-chloro-1,2-dihydro-3H,7H-quino[8,1-cd][1,5]benzoxazepin-3-one[2-(1-pyrrolidinyl)ethyl] oxime hydrochloride By following the procedure described in Example 2, but replacing the 1,2-dihydro-11-(trifluoromethyl)-3H,7H-quino[8,1-cd][1,5]benzoxazepin-3-one oxime with the corresponding 11-chloro analog [prepared as in Example 12 (Compound A)] there is obtained the product.

EXAMPLE 16

1,2-dihydro-3H,8H-quino[1,8-ab][4,1]benzoxazepin-3-one-[3-(4-(2-hydroxyethyl)-1-piperazinyl)propyl] oxime dimaleate By following the procedure given in Example 7, but replacing the 11-chloro-1,2-3H,8H-quino[1,8-ab][4,1]benzoxazepin-3-one oxime with 1,2-dihydro-3H,8H-quino[1,8-ab][4,1]benzoxazepin-3-one oxime, there is obtained the product.

The 1,2-dihydro-3H,8H-quino[1,8-ab][4,1]benzoxazepin-3-one oxime is prepared as follows:

I. 1,2-dihydro-3H,8H-quino[1,2-ab][4,1]benzoxazepin-3-one

A. 5,11-dihydrodibenz[b,e][1,4]oxazepine-5-propionic acid: A suspension of 30.4 g. of 5,11-dihydrodibenz[b,e][1,4]oxazepine in 90 ml. of acrylonitrile is cooled to 0–5°. To this is added with efficient stirring and cooling 0.9 ml. of Triton B. The suspension becomes homogeneous and a red solution results with the rise of temperature to 10°. The reaction mixture is allowed to come to room temperature and then refluxed for one hour with stirring. The excess of acrylonitrile is removed by known means, water is added, and the solid is filtered. The solid is dried, powdered, and extracted with five 400 ml. portions of diethyl ether. The diethyl ether extracts are dried and concentrated to a volume of 250 ml. The white crystalline compound is filtered. The filtrate is again concentrated and the resulting solid is filtered and found to melt at about 138–139.5°, and is identified as 5,11-dihydrodibenz[b,e][1,4]oxazepine-5-propionitrile.

The 5,11-dihydrodibenz[b,e][1,4]oxazepine-5,11-propionitrile, 5.0 g., is dissolved in 200 ml. of methanol and to this 2.24 g. of potassium hydroxide dissolved in 20 ml. of water is added. The solution is refluxed for 4 hours, and then is concentrated *in vacuo*. The resdiue is taken up in 600 ml. of $H_2O$, the solution is cooled, and then acidified with 2% aqueous HCl. The solid is filtered and dissolved in 600 ml .of $C_6H_6$. This solution is treated with Darco and then extracted with 600 ml. of 2% aqueous NaOH solution. The extracts are treated with Darco and Hyflo, filtered and the filtrate is acidified with 2% aqueous HCl. The solid is filtered and recrystallized from $C_6H_6$, and found to have a M.P. of about 203–205°.

B. 1,2-dihydro-3H,8H-quino[1,8-ab][4,1]benzoxazepin-3-one: In a 500 ml. flask equipped with stirring bar, thermometer, nitrogen inlet, dropping funnel and $CaCl_2$ guard tube, is suspended 10.8 g. of 5,11-dihydrodibenz[b,e][1,4]oxazepine-5-propionic acid in 220 ml. of $C_6H_6$. This is cooled to 10°, and to it is added a solution of 9.5 g. of $PCl_5$ in 50 ml. of benzene in 45 minutes. The reaction mixture is stirred for 1.5 hour at room temperature. To the resulting solution, 5.5 g. of sodium hydrosulfite is added and stirred for 15 minutes. The reaction mixture is filtered and the filtrate is concentrated *in vacuo* to yield a liquid residue. The residue is triturated with 70 ml. of petroleum ether to give a yellow solid, which is filtered. Of the acid chloride residue (9.6 g.), 8.6 g. are dissolved immediately in 220 ml. of benzene.

One gram of the above crude acid chloride is dissolved in 150 ml. of boiling petroleum ether, filtered, the filtrate treated with 0.2 g. of Darco, refluxed, and filtered again. This is stored overnight in the cold room. Crystallization does not occur. The solution is concentrated to 50 ml. and cooled in an acetone-$CO_2$ bath, when a pale yellow solid separates. This is filtered and dried *in vacuo* for 15 minutes; it softens at 60° and melts with decomposition at about 74–75°.

The above solution of 8.6 g. of the acid chloride in 220 ml. of benzene is placed in a flask equipped with a stirrer, a dropping funnel, and a reflux condenser guarded with a CaCl₂ tube. To this, while stirring, is added dropwise, a solution of 9.0 ml. of anhydrous SnCl₄ in 50 ml. of benzene. A viscous red complex forms which turns to violet towards the end of the addition. The reaction mixture is stirred for 1 hour and then 600 ml. if ether is added. To this, 20 ml. of conc. HCl and 150 ml. of distilled H₂O are added and the mixture stirred vigorously for 1 hour. The organic phase is separated, washed, filtered, and solvent removed and the residue is extracted successively with 300, 200 and 200 ml. portions of boiling cyclohexane. The combined cyclohexane extracts are concentrated to 75 ml. to give 2.9 g. of product, M.P. about 116–118°.

II. 1,2-dihydro-3H,7H-quino[8,1-cd][1,5]benzoxazepin-3-one, oxime

A mixture of 1.25 g. of 1,2-dihydro-3H,8H-quino[1,8-ab][1,5]benzoxazepin-3-one and 0.7 g. of hydroxylamine hydrochloride is dissolved in 140 ml. of hot 70% ethanol and refluxed for 6 hours; the reaction mixture is concentrated on the Rinco to 60 ml., when a yellow precipitate forms. After standing overnight in the cold room, yellow solid foms which is filtered and dried to give 1.35 g. of material; M.P. softens at 155°, and melts with decomposition at 170°. It is dissolved in 125 ml. of refluxing 75% ethanol, treated with 0.2 g. of Darco and filtered to give 1.2 g. of product, M.P. about 190–192°.

EXAMPLE 17

11-cyano-1,2-dihydro-3H,7H - quino[8,1 - cd][1,5]benzoxazepin-3-one (2-dimethylaminoethyl)oxime, hydrochloride By following the procedure described in Example 8, and replacing the 1,2-dihydro-11 - (trifluoromethyl) - 3H,7H-quino[8,1-cd][1,5]benzoxazepin-3-one oxime with the corresponding 11-cyano derivative, there is obtained 11-cyano-1,2-dihydro-3H,7H-quino[8,1 - cd][1,5]benzoxazepin-3-one (2-dimethylaminoethyl)oxime hydrochloride. The 11-cyano-1,2-dihydro-3H,7H - quino[8,1 - cd][1,5]benzoxazepin-3-one, oxime is prepared as follows:

A. 7-cyano-5,11-dihydrodibenz[b,e][1,4]oxazepine - 5-propionic acid: To 44.4 g. of 7-cyano-5,11-dihydrodibenzo[b,e][1,4]oxazepine in 60 ml. of acrylonitrile is added 0.80 ml. of Triton B. The mixture is heated for one hour under reflux and the product isolated by extraction with benzene to give 7-cyano-5,11-dihydrodibenz[b,e][1,4]oxazepine-5-propionitrile.

To 13.7 g. of 7-cyano-5,11-dihydrodibenz[b,e][1,4]-oxazepine-5-propionitrile in 240 ml. of dioxane is added 140 ml. of 30% methanolic hydrogen chloride. The solution is kept for 36 hours, 6 ml. of H₂O is added, and then concentrated in vacuo to about 120 ml., filtered, and the filtrate concentrated in vacuo. The residual liquid is dissolved in 200 ml. of diethyl ether, the ether solution is concentrated and the residue distilled in vacuo to give methyl 7 - cyano-5,11-dihydrodibenz[b,e][1,4]oxazepine-5-propionate, B.P. about 170–172° (0.08 mm.).

To methyl 7-cyano-5,11-dihydrodibenz[b,e][1,4]oxazepine-5-propionate, 3.1 g., in 315 ml. of methanol, is added 0.6 g. of potassium hydroxide in 25 ml. of water. The mixture is refluxed for 2.5 hours and then concentrated in vacuo. The residue is dissolved in 250 ml. of water and treated with an excess of 2% aqueous hydrochloric acid to give 7-cyano-5,11-dihydrodibenz[b,e][1,4]oxazepine-5-propionic acid.

B. 11 - cyano - 1,2 - dihydro - 3H,7H - quino[8,1-cd]-[1,5]-benzoxazepine-3-one: To 6.33 g. of 7-cyano-5,11-dihydrodibenz[b,e][1,4] - oxazepine-5-propionic acid in 50 ml. of benzene at 5–10° is added 4.6 g. of phosphorus pentachloride in 25 ml. of benzene during 15 minutes. The solution is stirred at 25° for 40 minutes, at 40–50° for 20 minutes, at 55° for 10 minutes, cooled and treated dropwise with 12.0 g. of anhydrous stannic chloride in 20 ml. of benzene. After stirring 20 minutes at 10° and 20 minutes at 20°, 100 ml. of ether are added, then 10 ml. of concentrated hydrochloric acid, and then 100 ml. of water. After stirring for 10 minutes, the organic phase is separated, the aqueous phase is extracted with 100 ml. of ether and the combined organic extracts are concentrated. The residue is recrystallized from 2-propanol to give about 4.3 g. of product.

C. 11 - cyano - 1,2 - dihydro - 3H,7H - quino[8,1-cd]-[1,5]benzoxazepin-3-one, oxime: A mixture of 36.0 g. of 11-cyano-1,2-dihydro-3H,7H-quino-[8,1-cd][1,5]benzoxazepine-3-one, and 17.5 g. of hydroxylamine hydrochloride is dissolved in 2 liters of warm 70% ethanol and refluxed for three hours. The reaction mixture is concentrated to 1.5 liters and allowed to cool. The resulting pale yellow needles are filtered and recrystallized from 70% ethanol to give about 28.5 g. of product.

EXAMPLE 18

11-chloro - 1,2 - dihydro-3H,8H-quino[1,8-ab][4,1]benzoxazepin-3-one, [2-(4-methyl - 1 - piperazinyl)ethyl]-oxime dihydrochloride Following the method described for Example 1 but replacing the 1,2-dihydro - 11 - (trifluoromethyl)-3H,7H-qino-[8,1-cd][1,5]benzoxazepin-3-one oxime and 1-(3-chloropropyl)-4-methylpiperazine with 11- chloro-1,2-dihydro - 3H,8H - quino[1,8-ab][4,1]benzoxazepin - 3 - one oxime and 1-(2-chloroethyl)-4-methylpiperazine, respectively, there is obtained 11-chloro - 1,2 - dihydro-3H,8H-quino - [1,8-ab][4,1]benzoxazepin - 3 - one, [2 - (4-methyl-1-piperazinyl)ethyl]oxime dihydrochloride.

EXAMPLE 19

11-chloro - 1,2 - dihydro-3H,7H-quino[8,1-cd][1,5]benzoxazepin-3-one, [3-(methylamino)propyl]oxime, hydrochloride A. To 23.4 g. of sodium amide in 400 ml. of anhydrous toluene, under nitrogen and at 0–5°, is added dropwise 31.9 g. of N-methyl formamide in 100 ml. of anhydrous toluene; the mixture is stirred for 2 hours at 25° and then 94.6 g. of trimethylenechlorbromide is added dropwise, and the mixture heated under reflux for 4 hours; the reaction mixture is cooled, filtered and the filtrate concentrated in vacuo. The liquid residue on distillation in vacuo gives 12.2 g. of N-(3-chloropropyl)-N-methylformamide, b₃₀ about 148–150.

Following the procedure of Example I, part III, but replacing 1,2 - dihydro-11-(trifluoromethyl)-3H,7H-quino-[8,1-cd][1,5]benzoxazepin-3-one oxime and 1-(3-chloropropyl)-4-methylpiperazine with 9.4 g. of 11-chloro-1,2-dihydro-3H,7H-quino[8,1-cd][1,5]benzoxazepin - 3 - one, oxime and 8.2 g. of N-(3-chloropropyl)-N-methylformamide respectively, there is obtained 10.7 g. of 11-chloro-1,2-dihydro - 3H,7H - quino[8,1-cd][1,5]benzoxazepin-3-one [3-(N-formyl-N-methylamino)propyl]oxime, as a base. This is dissolved in 300 ml. of 95% ethanol and to it 26 ml. of 20% aqueous hydrochloric acid is added. The mixture is heated under reflux for 3 hours, and concentrated to dryness in vacuo. To the residue 500 ml. of water is added, the solution washed with ether, and then treated with an excess of 50% aqueous NaOH; the liberated oil is isolated via ether extraction, which is treated with 2-propanolic hydrogen chloride to give 6.3 g. of 11-chloro-1,2 - dihydro - 3H,7H - quino[8,1 - cd][1,5]benzoxazepin-3-one, [3-methylamino)propyl]oxime, hydrochloride.

EXAMPLES 20 TO 34

Employing the procedures described in Example 1, but substituting the starting material shown in column A of TABLE I (Examples 20–23): Columns A (Starting material), B (3 or 3'-one, oxime), C (Q–Z–N reagent), D (Product). Structures not transcribed.

TABLE I—Continued

| Ex. No. | Column A<br>Starting material | Column B<br>3 or 3'-one, oxime | Column C<br>Q–Z–N⟨R³⟩(CH₂)ₓ/X' | Column D<br>Product |
|---|---|---|---|---|
| 24 | (structure) | (structure) | Cl–(CH₂)₄–N⟨pyrrolidine⟩ | (structure) |
| 25 | (structure) | (structure) | CH₃–⌬–SO₂–O–CH₂N⟨morpholine⟩ | (structure) |
| 26 | (structure) | (structure) | Cl–CH–CH₂–OCH₂N(CH₃)₂ / CH₃ with piperazine | (structure) |
| 27 | (structure) | (structure) | Br–CH₂CH–N⟨2,6-dimethylpiperidine⟩ | (structure) |

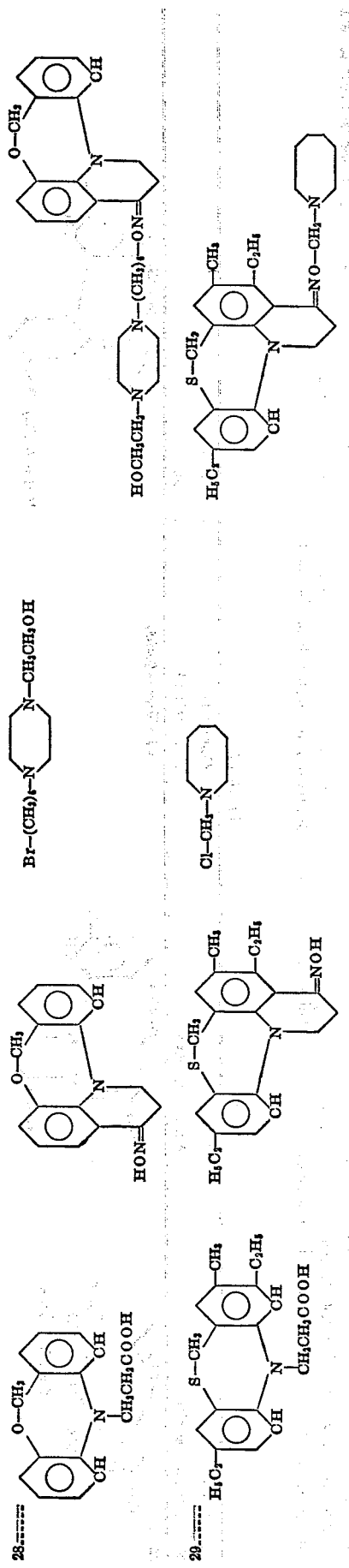
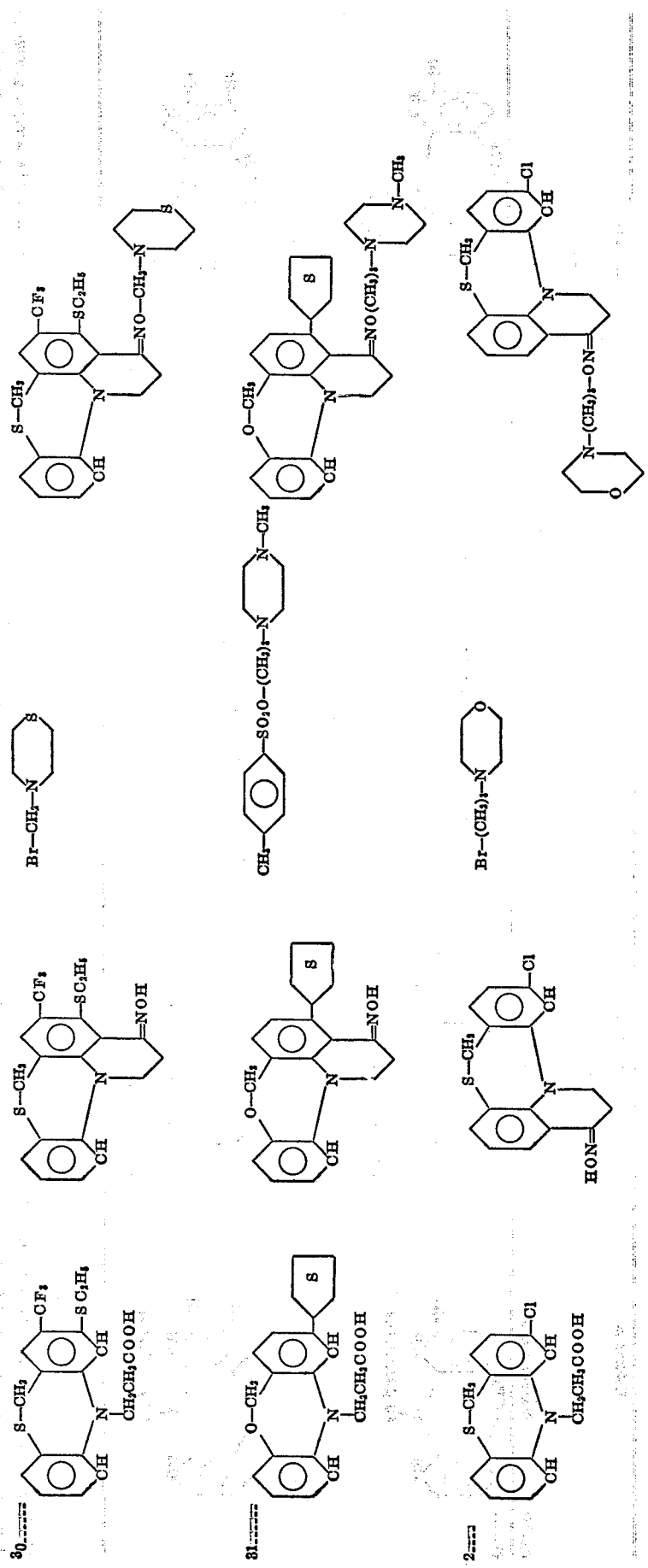

Table I preceding, the 3-one, oxime in column B is obtained; by reacting the 3-one oxime with the heterocyclic compound shown in column C as per Example I, part III, the product shown in column D is obtained.

EXAMPLES 35 to 44

Employing the procedure described in Example 1, but substituting the starting material shown in column A of Table II below, the 3-one, oxime in column B is obtained; by reacting the 3-one, oxime with the amine shown in column C, as per Example 1 (part III), the product shown in column D is obtained.

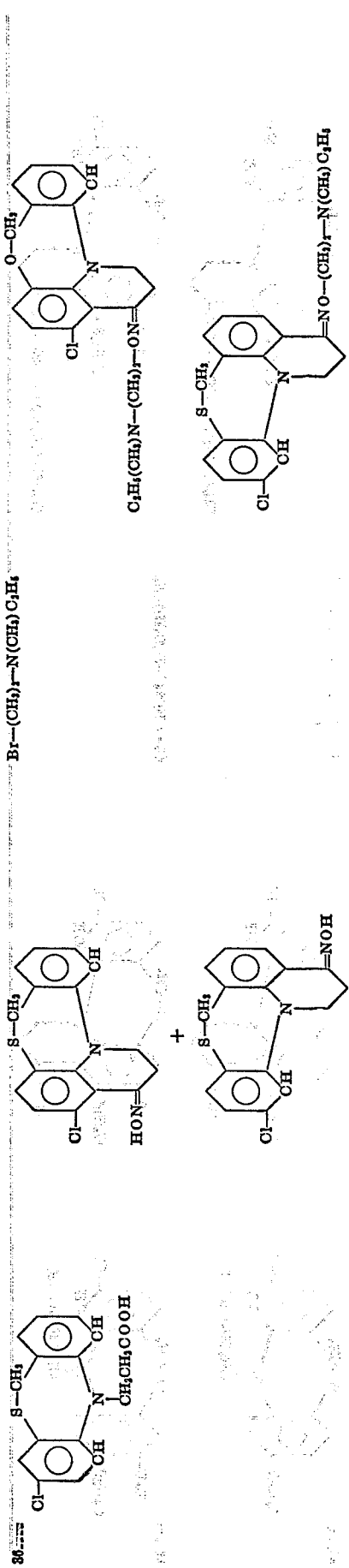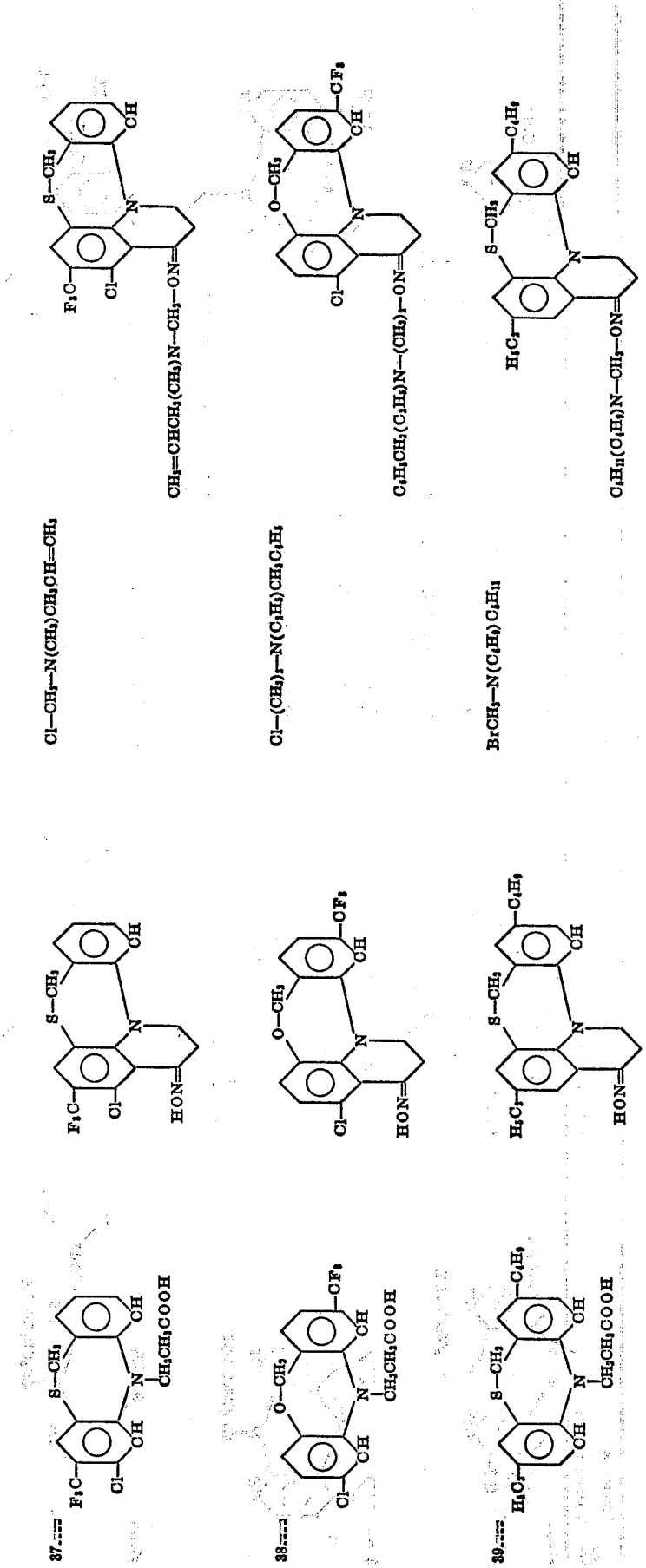

TABLE II—Continued

| Ex. No. | Column A<br>Starting material | Column B<br>3 or 3'-one, oxime | Column C<br>Q–Z–NR¹R² | Column D<br>Product |
|---|---|---|---|---|
| 40 | [structure] | [structure] | [structure with SO₂O–CH₂–N(CH₂C₂H₅)₂] | [structure with (C₂H₅(CH₃))₂N–CH₂–CH₂–ON=] |
| 41 | [structure] | [structure] | CH₃<br>Cl–CHCH₂–N(CH₃)₂CH=CH₂ | CH₂=CH(CH₃)₂N–CH₃–CH₂–ON= |
| 42 | [structure] | [structure] | Cl–(CH₂)₂–N(C₂H₅)₂ | (C₂H₅)₂N–(CH₂)₂–ON= |
| 43 | [structure] | [structure] | Br–(CH₂)₂–N(C₆H₁₁)CH₃ | CH₃(C₆H₁₁)N–(CH₂)₂–ON= |
| 44 | [structure] | [structure] | Cl–CH₂N(C₂H₄C₆H₅)CH₃ | CH₃(C₂H₄C₆H₅)N–CH₂–ON= |

What is claimed is:
1. A compound having the structure

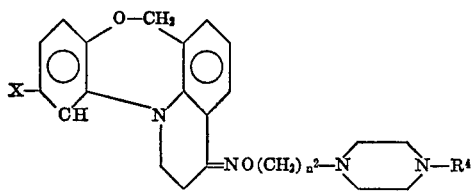

wherein X is trifluoromethyl or chloro, $n^2$ is an integer of from 1 to 6, $R^4$ is lower alkyl or hydroxy-lower alkyl, wherein lower alkyl is an alkyl group having up to eight carbon atoms, and a non-toxic acid-addition salt thereof.

2. A compound in accordance with claim 1 wherein X is chloro.

3. A compound in accordance with claim 1 wherein X is trifluoromethyl.

4. A compound in accordance with claim 1 wherein $R^4$ is lower alkyl.

5. The compound in accordance with claim 1 having the name 1,2-dihydro-11-(trifluoromethyl)-3H,7H-quino[8,1-cd][1,5]benzoxazepin-3-one, [3-(4-methyl-1-piperazinyl)propyl]oxime.

6. The compound in accordance with claim 3 having the name 1,2-dihydro-11-(trifluoromethyl)-3H,7H-quino[8,1-cd][1,5]benzoxazpein-3-one, [3-(4-methyl-1-piperazinyl)ethyl]oxime.

7. A compound in accordance with claim 1 having the structure

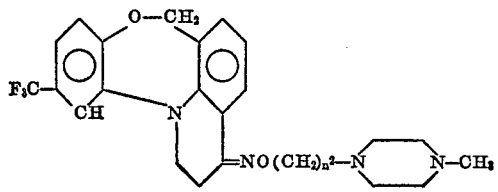

wherein $n^2$ is 2 or 3.

8. A compound having the structure

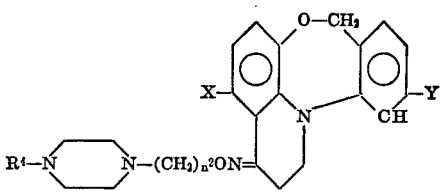

wherein X is hydrogen or chloro, Y is hydrogen or chloro, but at least one of X and Y must be hydrogen, $n^2$ is an integer of from 1 to 6, $R^4$ is lower alkyl or hydroxy-lower alkyl, wherein lower alkyl is an alkyl group having up to eight carbon atoms, and a non-toxic acid-addition salt thereof.

References Cited
UNITED STATES PATENTS 3,676,445    7/1972    Yale et al. _____ 260—288

DONALD G. DAUS, Primary Examiner

U.S. Cl. X.R.

260—239 BC, 243 C, 247.1, 247.5 B, 293.57, 293.58, 2830 N, 2835, 2835 A, 288 R, 326.5 CA, 327 B, 333, 999

UNITED STATES PATENT OFFICE
CERTIFICATE OF CORRECTION

Patent No. 3,813,396  Dated May 28, 1974

Inventor(s) Harry L. Yale and Ramesh B. Petigara

It is certified that error appears in the above-identified patent and that said Letters Patent are hereby corrected as shown below:

Column 2, Formula II, that portion of the formula reading:

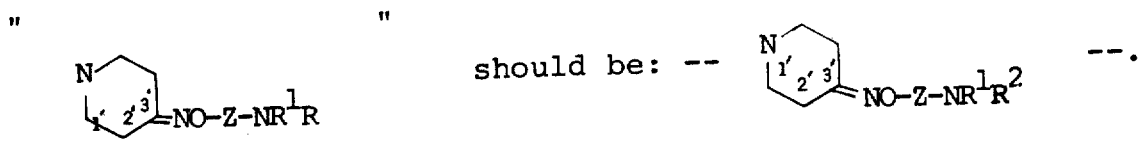

Column 3, line 38, the words "starting material II" should be: -- starting material III --.

Column 3, lines 68 to 75, the structure should be labeled: -- (IV) --.

Column 6, line 69, the number "II" should be: -- III --.

Column 11, line 23, that portion reading: "dihydrodizenz" should be: -- dihydrodibenz --.

Column 15, line 61, delete the right parenthesis " ) " after the word "methyl".

Column 18, line 19, that portion reading: "[1,2-ab]" should be: -- [1,8-ab] --.

Column 21, Example 20, Column A, that portion of the formula reading:

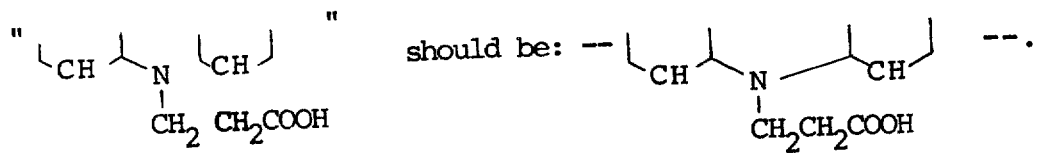

Part 2 of 2

UNITED STATES PATENT OFFICE
CERTIFICATE OF CORRECTION

Patent No. 3,813,396  Dated May 28, 1974

Inventor(s) Harry L. Yale and Ramesh B. Petigara

It is certified that error appears in the above-identified patent and that said Letters Patent are hereby corrected as shown below:

Column 26, the example after "31" should be: -- 32 --.

Column 29, Example 36, Column D, that portion of the formula reading:

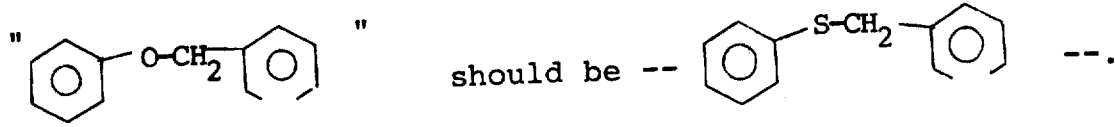

Signed and sealed this 1st day of October 1974.

(SEAL)
Attest:

McCOY M. GIBSON JR.
Attesting Officer

C. MARSHALL DANN
Commissioner of Patents